(12) United States Patent  
Tomita et al.

(10) Patent No.: US 8,088,702 B2
(45) Date of Patent: Jan. 3, 2012

(54) BONDED BODY, BONDING MATERIAL COMPOSITION, HONEYCOMB SEGMENT BONDED BODY, AND HONEYCOMB STRUCTURE USING THE SAME

(75) Inventors: Takahiro Tomita, Chita (JP); Kenji Morimoto, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 570 days.

(21) Appl. No.: 12/235,379

(22) Filed: Sep. 22, 2008

(65) Prior Publication Data

US 2009/0022943 A1 Jan. 22, 2009

Related U.S. Application Data

(63) Continuation of application No. PCT/JP2007/056106, filed on Mar. 23, 2007.

(30) Foreign Application Priority Data

Mar. 24, 2006 (JP) ................. 2006-082103

(51) Int. Cl.
  *C04B 38/00* (2006.01)
  *B32B 3/12* (2006.01)
  *B01D 39/06* (2006.01)
(52) U.S. Cl. ............................ 501/80; 428/116; 55/523
(58) Field of Classification Search .................... None
  See application file for complete search history.

(56) References Cited

U.S. PATENT DOCUMENTS

| 2002/0197193 | A1  | 12/2002 | Harada et al. |
| 2005/0076626 | A1* | 4/2005 | Kudo et al. ................ 55/523 |
| 2005/0109023 | A1* | 5/2005 | Kudo et al. ................ 60/311 |
| 2008/0138568 | A1  | 6/2008 | Tomita et al. |

FOREIGN PATENT DOCUMENTS

| EP | 1 142 619 A1 | 10/2001 |
| EP | 1 508 355 A1 | 2/2005 |
| EP | 1 508 356 A1 | 2/2005 |
| EP | 1 508 357 A1 | 2/2005 |
| EP | 1 508 358 A1 | 2/2005 |
| JP | A-2001-162119 | 6/2001 |
| JP | A-2001-190916 | 7/2001 |
| JP | A-2002-177719 | 6/2002 |
| WO | WO 03/067041 A1 | 8/2003 |
| WO | WO 2007/116665 A1 | 10/2007 |

* cited by examiner

*Primary Examiner* — Gordon R Baldwin
(74) *Attorney, Agent, or Firm* — Oliff & Berridge, PLC

(57) ABSTRACT

There is provided a bonding material composition capable of suppressing crack generation on an end face of a resultant honeycomb structure to a large extent by reducing anisotropy of Young's modulus after curing of the bonding material by the use of an isotropic filler without using inorganic fibers. The bonded body has two or more members unitarily bonded by means of a bonding material layer, and the relational expression of $0.5<Ez/Ex<1.5$ is satisfied when a Young's modulus in a direction perpendicular to a bonded surface of the bonding material layer is Ez and a Young's modulus in a direction parallel to the bonded surface and parallel to a longer axial direction of the bonded surface is Ex and wherein the bonded material has a porosity of 25 to 85%.

16 Claims, 2 Drawing Sheets

BONDED BODY, BONDING MATERIAL COMPOSITION, HONEYCOMB SEGMENT BONDED BODY, AND HONEYCOMB STRUCTURE USING THE SAME

TECHNICAL FIELD

The present invention relates to a ceramic structure where a plurality of ceramic members are bonded together. In particular, the present invention relates to a bonded body suitably used for a honeycomb structure where a plurality of honeycomb segments are unitarily bonded, a bonding material composition, and a honeycomb segment bonded body.

BACKGROUND ART

A honeycomb structure is incorporated into an exhaust gas system or the like of a diesel engine as a trapping filter for exhaust gas, for example, as a diesel particulate filter (DPF) for trapping and removing particulate matter contained in exhaust gas from a diesel engine or the like.

Such a honeycomb structure has a structure where a plurality of cells separated and formed by porous partition walls of, for example, silicon carbide (SiC) and functioning as fluid passages are disposed in parallel with the direction of the central axis. End portions of the adjacent cells are alternately plugged (in a checkerwise pattern). That is, a cell has an open end portion on one side and a plugged end portion on the other side, and another cell adjacent to the above cell has a plugged end portion on one side and an open end portion on the other side.

By such a structure, exhaust gas can be purified by passing the exhaust gas allowed to flow into predetermined cells (inflow cells) from end portions on one side through the porous partition walls to allow the exhaust gas to flow out via the cells (outflow cells) adjacent to the inflow cells, thereby trapping particulate matter in the exhaust gas by the partition walls when the exhaust gas passes through the partition walls.

In order to continuously use such a honeycomb structure (filter) for a long period of time, the filter needs to be regenerated. That is, in order to remove the increase in pressure loss due to the particulate matter accumulating inside the filter with time, it is necessary to combust the particulate matter accumulating inside the filter for removal. Upon the filter regeneration, large thermal stress generates, and there arises a problem of causing defects such as a crack or breakage in the honeycomb structure by the thermal stress. In order to respond to a demand of improving thermal shock resistance against such thermal stress, there has been proposed a honeycomb structure having a segmentalized structure having a function of dispersing and reducing the thermal stress by unitarily bonding a plurality of honeycomb segments by a bonding material layer, and thereby the thermal shock resistance could be improved to some extent. Such a honeycomb structure of a divided structure has a structure where a plurality of honeycomb segments each having a shape constituting a part of the whole structure and a shape constituting the whole structure by being combined in a direction perpendicular to the central axis are unitarily bonded by a bonding material layer to form a honeycomb segment-bonded body having a cross-sectional shape of a predetermined shape such as a circle cut along a plane perpendicular to the central axis, followed by coating the outer peripheral face of the honeycomb segment-bonded body with a coating material.

However, since a demand for increasing in size of a filter has grown in recent years, thermal stress generating upon regeneration has increased. Accordingly, in order to inhibit the above defects, improvement in thermal shock resistance as a structure has strongly been desired. Above all, it has been desired to realize an excellent stress-relieving function and bonding strength in a bonding material layer for unitarily bonding a plurality of honeycomb segments in order to realize a honeycomb structure excellent in thermal shock resistance.

To cope with such a problem, there has been disclosed that use of a sealing agent, as a bonding material for unitarily bonding a plurality of honeycomb segments, constituted of inorganic fibers, an organic binder, an inorganic binder, and inorganic particles with the inorganic fibers having a orientation degree of 70% or more can obtain an effect in suppressing expansion and contraction in a longer axial direction of the filter (ceramic structure) and that thermal stress applied to the filter (ceramic structure) can be released even under severe use conditions (see Patent Document 1).

However, since the sealing agent disclosed in the Patent Document 1 contains an anisotropic filler such as an inorganic fiber, a Young's modulus after curing has anisotropy. That is, the above sealing agent has a low Young's modulus in a direction perpendicular to a bonded surface with a honeycomb segment and has a relatively high Young's modulus in a direction inside the bonded surface (in particular, longer axial direction). That is, with respect to the thermal stress of expansion or contraction in a longer axial direction between honeycomb segments, the sealing agent restrains honeycomb segments too much, and, as a result, there arises a problem of easily causing a crack on an end face of the resultant honeycomb structure.

In addition, since a sealing agent disclosed in the Patent Document 1 is a bonding material, and it is necessary to control properties of the bonding material by thickness, width, and length of inorganic fibers as a filler, there arises a problem of high costs.

Further, since the sealing agent disclosed in the Patent Document 1 employs inorganic fibers as a filler for the bonding material, it is not always harmless to humans.
Patent Document 1: JP-A-2002-177719

DISCLOSURE OF THE INVENTION

The present invention has been made in view of the problems of the aforementioned prior art and aims to provide a bonding material composition capable of suppressing crack generation on an end face of a resultant honeycomb structure to a large extent without to much restraining honeycomb segments with respect to the thermal stress of expansion and contraction in a longer axial direction of a bonding material layer between honeycomb segments by reducing anisotropy of Young's modulus after curing of the bonding material by the use of an isotropic filler without using inorganic fibers which cost a lot and are not always harmless to humans and provides a bonded body.

In order to achieve the above aim, according to the present invention, there is provided the following bonded body, bonding material composition used for the bonded body, honeycomb segment bonded body using the composition, and honeycomb structure using the honeycomb segment bonded body.

[1] 1. A bonded body having two or more members unitarily bonded by means of a bonding material layer, wherein the relational expression of $0.5<Ez/Ex<1.5$ is satisfied when a Young's modulus in a direction perpendicular to a bonded surface of the bonding material layer is $Ez$ and a Young's modulus in a direction parallel to the bonded surface and parallel to a longer axial direction of the bonded surface is $Ex$ and wherein the bonded material has a porosity of 25 to 85%.

[2] A bonded body according to [1], wherein a bonding material composition forming the bonding material layer contains a filler having a degree of circularity of 0.7 to 1 at a ratio of 40 to 100 volume % with respect to the whole filler.

[3] A bonded body according to [1] or [2], wherein the bonding material layer has an average pore size of 0.5 to 50 μm.

[4] A bonded body according to any one of [1] to [3], wherein the bonding material layer has pores having the size of 0.5 to 50 μm at a ratio of 50% or more with respect to the whole pores.

[5] A bonded body according to any one of [1] to [4], wherein, in the case of bonding a member (A) to be bonded to a member (B) to be bonded by means of a bonding material layer having a thickness of t, when a portion having a thickness of 0.25 t from the interface between the member (A) and the bonding material layer of the bonding material layer is defined as a bonding material layer (1), a portion having thickness of 0.25 t from the interface between the member (B) and the bonding material layer of the bonding material layer is defined as a bonding material layer (3), and a portion having a thickness of 0.5 t between the bonding material layer (1) and the bonding material layer (3) is defined as a bonding material layer (2), an average porosity ϵ1 of the bonding material layers (1) and (3) and a porosity ϵ2 of the bonding material layer (2) satisfy the relation: $0.9 < \epsilon 2/\epsilon 1 < 1.4$.

[6] A bonded body according to any one of [1] to [5], wherein a Young's modulus (Ez) of the bonding material layer is 0.1 to 20% of that of the members to be bonded.

[7] A bonded body according to any one of [1] to [6], wherein an average linear thermal expansion coefficient of the bonding material layer is 0.1 to 70% of that of the members to be bonded.

[8] A bonded body according to any one of [1] to [7], wherein the bonding material layer has a thermal conductivity of 0.1 to 20 W/mK.

[9] A bonded body according to any one of [1] to [8], wherein the filler is at least one kind selected from the group consisting of silica, alumina, mullite, zirconia, cordierite, silicon carbide, silica glass, and alumina-silica glass.

[10] A bonding material composition for forming a bonding material layer used for a bonded body according to any one of [1] to [9], wherein the bonding material composition contains a filler and an inorganic bonding agent as main components.

[11] A bonding material composition according to [10], wherein the filler is at least one kind selected from the group consisting of silica, alumina, mullite, zirconia, cordierite, silicon carbide, silica glass, and alumina-silica glass.

[12] A bonding material composition according to [10] or [11], wherein the bonding material composition contains 0.1 to 2.5 mass % of a resin balloon.

[13] A bonded body having a bonding material layer formed of a bonding material composition according to any one of [10] to [12].

[14] A honeycomb segment bonded body manufactured by bonding a plurality of honeycomb segments together by a bonding material composition according to any one of [10] to [12].

[15] A honeycomb structure manufactured by a honeycomb segment bonded body according to [14].

As described above, a bonding material composition of the present invention can suppress crack generation on an end face of a resultant honeycomb structure to a large extent without too much restraining honeycomb segments with respect to the thermal stress of expansion and contraction in a longer axial direction of a bonding material layer between honeycomb segments by reducing anisotropy of Young's modulus after curing of the bonding material by the use of an isotropic filler without using inorganic fibers which cost a lot and are not always harmless to humans.

DESCRIPTION OF REFERENCE NUMERALS

Figure 1:
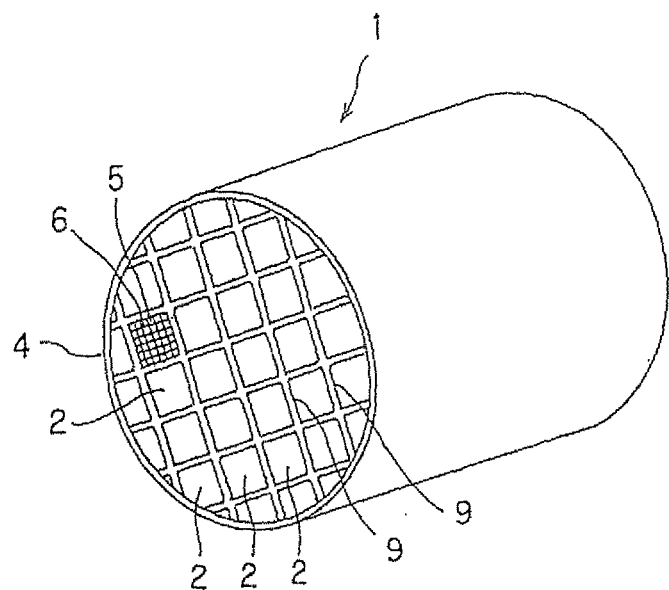
FIG. 1 is a perspective view schematically showing an embodiment (a circular cross section of the whole cut along a plane perpendicular to the central axis) of a honeycomb structure of the present invention.

1 . . . honeycomb structure, 2 . . . honeycomb segment, 4 . . . coating material, 5 . . . cell, 6 . . . partition wall, 7 . . . filling material, 9 . . . bonding material layer

BEST MODE FOR CARRYING OUT THE INVENTION

Hereinbelow, the present invention will be described in detail on the basis of a specific embodiment. However, the present invention is by no means limited to the embodiment, and various changes, modifications, improvements may be added thereto based on a person of ordinary skill.

A bonded body of the present invention is a bonded body obtained by unitarily bonding two or more members to be bonded via a bonding material layer. When a Young's modulus in a direction perpendicular to a bonded surface of the bonding material layer is defined as Ez, and a Young's modulus in a direction parallel to the bonded surface and parallel to a longer axial direction of the bonded surface is defined as Ex, Ez and Ex satisfy the relational expression of $0.5 < Ez/Ex < 1.5$, and the bonded material has a porosity of 25 to 85%.

Here, in a bonding material layer of a bonded body of the present invention, $0.5 < Ez/Ex < 1.5$, preferably $0.6 < Ez/Ex < 1.3$.

In addition, a bonding material layer of the present invention has a porosity of 25 to 85%, more preferably 30 to 80%. This is because a porosity of below 25% causes too high Young's modulus and restrains members to be bonded, which makes stress release impossible, and because a porosity of above 85% does not impart strength sufficient for bonding.

At this time, a bonding material composition forming the bonding material layer contains a filler having a degree of circularity of 0.7 to 1 at a ratio of preferably 40 to 100 volume % (more preferably 50 to 100 volume %) with respect to the whole filler. This is because, when the ratio of a filler having a degree of circularity of 0.7 to 1 is below 40 volume % with respect to the whole filler, the ratio of a filler having a circularity of below 0.7 is high to make anisotropy due to orientation of the filler remarkable.

In addition, the bonding material layer has an average pore size of preferably 0.5 to 50 μm (more preferably 1 to 40 μm) and pores having the size of 0.5 to 50 μm at a ratio of preferably 50% or more (more preferably 60% or more) with respect to the whole pores. This is because, when pores are too large, strength is lowered, which may make bonding impossible.

Further, in a bonded body of the present invention, in the case of bonding a member (A) to be bonded to a member (B) to be bonded by means of a bonding material layer having a thickness of t, when a portion having a thickness of 0.25 t from the interface between the member (A) and the bonding material layer of the bonding material layer is defined as a bonding material layer (1), a portion having thickness of 0.25 t from the interface between the member (B) and the bonding material layer of the bonding material layer is defined as a bonding material layer (3), and a portion having a thickness of 0.5 t between the bonding material layer (1) and the bonding material layer (3) is defined as a bonding material layer (2), an average porosity $\epsilon 1$ of the bonding material layers (1) and (3) and a porosity $\epsilon 2$ of the bonding material layer (2) satisfy the relation: $0.9 < \epsilon 2/\epsilon 1 < 1.4$, preferably $1 < \epsilon 2/\epsilon 1 < 1.3$. This is because crack may generate easily in a portion near the bonded surface when $\epsilon 2/\epsilon 1$ is 0.9 or less and because pores concentrate in the center of the bonding material layer to sometimes cause fracture in a bonding portion on the face when $\epsilon 2/\epsilon 1$ is 1.4 or more.

In a bonding material layer in the present invention, a Young's modulus (Ez) of the bonding material layer is preferably 0.1 to 20% (more preferably 0.15 to 15%) of that of the members to be bonded.

In addition, in a bonding material layer in the present invention, an average linear thermal expansion coefficient of the bonding material layer is preferably 0.1 to 70% (more preferably 0.2 to 65%) of that of the members to be bonded.

Further, in a bonding material layer in the present invention, the bonding material layer has a thermal conductivity of preferably 0.1 to 20 W/mK (more preferably 0.15 to 15 W/mK).

Incidentally, a bonding material composition of the present invention contains a filler and a matrix as main components and additives such as an organic binder and water. The ratio of the filler in a bonding material component is preferably 10 to 95 volume % (more preferably 20 to 90 volume %), and the ratio of the matrix in a bonding material component is preferably 5 to 90 volume % (more preferably 10 to 80 volume %).

Incidentally, the filler used in the present invention is preferably at least one kind selected from the group consisting of oxides, nitrides, carbides, and metals and more preferably at least one kind selected from the group consisting of silica, alumina, mullite, zirconia, cordierite, silicon carbide, silica glass, and alumina-silica glass.

In addition, since the matrix used in the present invention is required to moderately bond a filler particle to another filler particle or a member to be bonded and a filler, the matrix is preferably an inorganic bonded agent, for example, colloidal silica, colloidal alumina, ethyl silicate, liquid glass, silica polymer, aluminum phosphate, or bentonite. In particular, colloidal silica is more preferable because it is excellent in bonding force, conformability with the filler, chemical stability, thermal resistance, and the like.

Incidentally, a bonding material composition (pasty bonding material) of the present invention can be manufactured by mixing the aforementioned fillers, adding, as necessary, an organic binder (for example, methyl cellulose (MC), and carboxymethyl cellulose (CMC)), a resin balloon, and a dispersant, and mixing, as a matrix, an inorganic bonding agent (for example, colloidal silica) and, in some cases, water, followed by kneading for a predetermined period of time with a mixer.

In a bonding material composition of the present invention, the bonding material composition contains preferably 0.1 to 2.5 mass %, more preferably 0.5 to 2.0 mass %, of a resin balloon. When it is below 0.1 mass %, sufficient porosity cannot be obtained, and the Young's modulus may be high. When it is above 2.5 mass %, porosity may be too high to obtain sufficient bonding strength.

When members to be bonded are bonded together using a bonding material composition of the present invention, the bonding temperature is preferably 1000° C. or less (more preferably 50° C. or more and 900° C. or less, furthermore preferably 100° C. or more and 800° C. or less) from the viewpoint of exhibiting sufficient strength and bonding conditions. Even when the temperature is above 1000° C., bonding can be performed with no problem. However, it is not preferable because desired characteristics (e.g., Young's modulus and thermal expansion coefficient) cannot be obtained easily.

Next, an example of a structure of a honeycomb structure where a bonding material composition (bonding material) of the present invention is applied will specifically be described.

Figure 2:
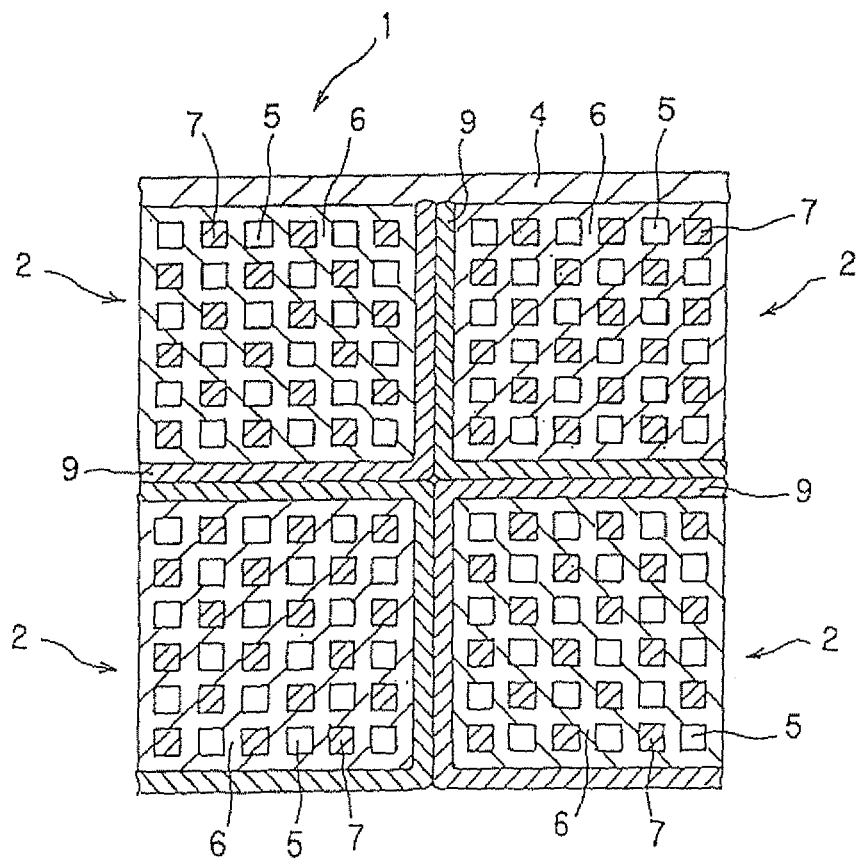
FIG. 2 is a front view viewed from an end face side of a part of another embodiment (a square cross section of the whole cut along a plane perpendicular to the central axis) of a honeycomb structure of the present invention.

As shown in FIGS. 1 and 2, a honeycomb structure 1 of the present invention has a structure where a plurality of cells 5 separated and formed by porous partition walls 6 and functioning as fluid passages are disposed in parallel with the direction of the central axis of the honeycomb structure 1 and is constituted as a honeycomb segment bonded body where a plurality of honeycomb segments 2 having a shape of constituting a part of the whole structure and a shape of constituting the whole structure by being combined in a direction perpendicular to the central axis of the honeycomb structure 1 are unitarily bonded with a bonding material layer 9 formed of a bonding material composition (bonding material) of the present invention.

Here, after the bonding of the honeycomb segments 2 by the bonding material layer 9, the bonded body is subjected to cutting operation in such a manner that the whole cross-section cut along a plane perpendicular to the central axis of the honeycomb structure 1 has a shape of a circle, an ellipse, a triangle, a square, or the like, and the outer peripheral face is covered with a coating material 4. When the honeycomb structure 1 is used as a DPF, by disposing the structure in an exhaust gas system or the like of a diesel engine, particulate matter containing soot discharged from a diesel engine can be trapped.

Figure 3:
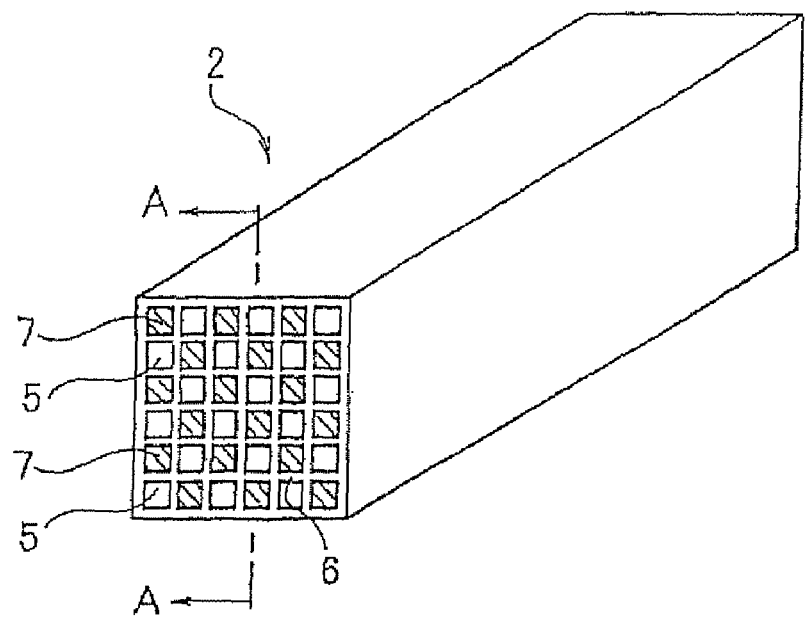
FIG. 3 is a perspective view schematically showing a honeycomb segment used for another embodiment of a honeycomb structure of the present invention.
Figure 4:
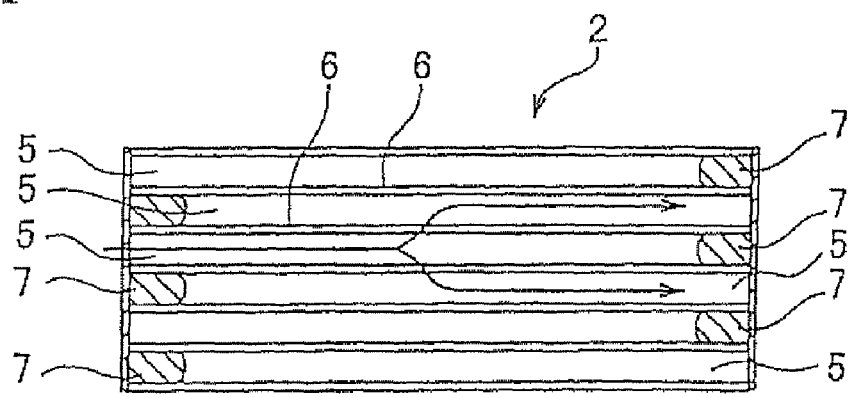
FIG. 4 is a cross-sectional view along A-A line in FIG. 3.

In addition, in FIG. 1, cells 5 and partition walls 6 are shown in only one honeycomb segment 2. As shown in FIGS. 3 and 4, each honeycomb segment 2 has a shape of constituting a part of the whole structure of the honeycomb structure 1 (see FIG. 1) and a shape of constituting the whole structure by being combined in a direction perpendicular to the central axis of the honeycomb structure 1 (see FIG. 1). The cells 5 are disposed in parallel with the direction of the central axis of the honeycomb structure 1, and each end portion in adjacent cells 5 is alternately plugged with a filling material 7.

Predetermined cells 5 (inflow cells) are open on the left end portion side in FIGS. 3 and 4, while the cells are plugged with the filling material 7 on the right end portion side. Other cells 5 (outflow cells) adjacent to the above cells are plugged with a plugging material 7 on the left end portion side and open on the right end portion side. Such plugging forms a checkerwise pattern on each end face of the honeycomb segments 2. When a honeycomb structure 1 having such honeycomb segments 2 bonded together is disposed in an exhaust gas system of exhaust gas, exhaust gas flows into the cells 5 of each honeycomb segment 2 from the left side in FIG. 4 and moves to the right side.

FIG. 4 shows a case where exhaust gas inlet is on the left side of the honeycomb segment 2, and exhaust gas flows into the honeycomb segment 2 from the open cells 5 (inflow cells) without being plugged. The exhaust gas flown into the cells 5 (inflow cells) passes through the porous partition walls 6 and flows out from the other cells 5 (outflow cells). When the exhaust gas passes through the partition walls 6, particulate matter containing soot in the exhaust gas is trapped by the partition walls 6. Thus, exhaust gas can be purified. Since particulate matter containing soot accumulates inside the honeycomb segment 2 with time by such trapping to increase pressure loss, regeneration by combusting soot and the like is conducted. Incidentally, though FIGS. 2 to 4 show a honeycomb segment 2 having a square cross section, the section may have a shape of a triangle, a hexagon, or the like. In addition, the cells 5 may have a cross-sectional shape of a triangle, a hexagon, a circle, an ellipse, or the like.

As shown in FIG. 2, the bonding material layer 9 is formed of a bonding material composition (bonding material) of the present invention and applied on an outer peripheral face of each of the honeycomb segments to function so as to bond the honeycomb segments together. Though the bonding material layer 9 may be applied on the outer peripheral faces of each of the adjacent honeycomb segments 2, it may be applied on only one of the corresponding outer peripheral faces between adjacent honeycomb segments 2. Such application on only one of the corresponding faces is preferable in that an amount of the bonding material layer 9 used can be saved. The direction of application of the bonding material layer 9 is not particularly limited and may be a longer axial direction inside the outer peripheral Lace of the honeycomb segment, a direction perpendicular to the longer axial direction inside the outer peripheral face, a direction perpendicular to an outer peripheral face of the honeycomb segment, or the like. However, application toward a longer axial direction inside the outer peripheral face of the honeycomb segment is preferable. The thickness of the bonding material layer 9 is determined in consideration of bonding force between honeycomb segments 2 and suitably selected within the range of, for example, 0.5 to 3.0 mm.

Examples of the material for the honeycomb segments 2 used in the present embodiment include silicon carbide (SiC) a silicon-silicon carbide-based composite material formed by using silicon carbide (SiC) as the framework and silicon (Si) as the bonding material, silicon nitride, cordierite, mullite, alumina, spinel, a silicon carbide-cordierite-based composite, lithium aluminum silicate, aluminum titanate, and Fe—Cr—Al-based metal from the viewpoints of strength and thermal resistance. Of these, a material constituted of silicon carbide (SiC) or a silicon-silicon carbide-based composite material is preferable.

The honeycomb segment 2 can be manufactured by, for example, adding a binder such as methyl cellulose, hydroxypropoxyl cellulose, hydroxyethyl cellulose, carboxymethyl cellulose, and polyvinylalcohol, a surfactant, water as a solvent, and the like to a material suitably selected from the aforementioned materials to prepare kneaded clay having plasticity; extrusion forming kneaded clay into the aforementioned shape; drying formed article with microwaves, hot air, or the like; and sintering dried article.

As the filling material 7 used for plugging, a material similar to that for the honeycomb segment 2 can be used. Plugging with the filling material 7 can be conducted by filling the filling material 7 into the opening cells by immersing an end face of the honeycomb segment 2 in the slurried filling material 7 in a state that cells 5 not to be plugged are masked. Though filling of the filling material 7 may be conducted before firing after forming of the honeycomb segment 2 or may be conducted after firing, the filling conducted before firing is preferable because the firing step is required only once.

After such manufacturing of the honeycomb segments 2, a pasty bonding material (bonding material composition) is applied on outer peripheral faces of the honeycomb segments 2 to form a bonding material layer 9, and the honeycomb segments 2 are joined together to obtain a predetermined three dimensional shape (whole structure of the honeycomb structure 1). The honeycomb segments 2 are subjected to compression-bonding in such a joined state, followed by heat drying. Thus, a bonded body where a plurality of honeycomb segments 2 are unitarily bonded can be manufactured. Then, the bonded body is subjected to a cutting operation into the aforementioned shape, and the outer peripheral face is covered with a coating material 4, followed by heat drying. Thus, the honeycomb structure 1 shown in FIG. 1 can be manufactured. As a material for the coating material 4, a material similar to that for the bonding material layer 9 can be used. The thickness of the coating material 4 is suitably selected within the range of, for example, 0.1 to 1.5 mm.

EXAMPLES

Hereinbelow, the present invention will be described more specifically by Examples. However, the present invention is by no means restricted by these Examples.

Example 1

Manufacture of Honeycomb Segment

As honeycomb segment raw materials, a SiC powder and a metal Si powder were mixed together at a mass ratio of 80:20, and a pore former, an organic binder, a surfactant, and water were added to the mixture to prepare kneaded clay having plasticity. The kneaded clay was subjected to extrusion forming and then drying to obtain a honeycomb segment formed body having a partition wall thickness of 310 μm, a cell density of about 46.5 cells/cm$^2$ (300 cells/inch$^2$), a square cross section having a side of 35 mm, and a length of 152 mm. The honeycomb segment formed body was subjected to plugging at both end faces so that the end faces show a checker-wise pattern. That is, plugging was performed in such a manner that adjacent cells were plugged at mutually opposite ends. As the plugging material, a material similar to that for the honeycomb segment raw material was used. At the end faces, plugging and drying were performed, followed by degreasing at about 400° C. in an ambient atmosphere and then firing at about 1450° C. in Ar inert atmosphere to obtain a honeycomb segment having a porous structure where SiC crystalline particles were bonded by Si.

(Preparation of Bonding Material Composition)

To a mixture of fillers under the conditions shown in Table 1 were added a dispersant, a resin balloon, and an organic binder (OMC and MC), and further added colloidal silica as a matrix, followed by kneading for 30 minutes with a mixer to obtain pasty bonding materials (bonding materials Nos. 1 to 12) differing in kind and composition ratio. Incidentally, in Table 1, volume % (vol %) of each of the fillers and the matrix were indicated so that the total thereof became 100%, and the other additives were indicated as mass % of superaddition with defining the total amounts of the fillers and the matrix as 100%.

(Measurement of Degree of Circularity of Filler)

A degree of circularity of each of the fillers was calculated using the following formula by analyzing a projection image of a filler particle by the use of a particle size and shape imaging system. The results are shown in Table 1.

Circularity=(length of circumference of a circle having an equal area as that of projected particle)/(length of circumference of projected particle)

(Manufacture of Honeycomb Structure)

The bonding material No. 1 is applied on the outer wall face of the honeycomb segment so as to have a thickness of about 1 mm with the application direction being the longer axial direction of a honeycomb segment to form a bonding material layer. The step of mounting another honeycomb segment on the aforementioned segment was repeated to manufacture a honeycomb segment laminated body of 16 (4×4) honeycomb segments, and the whole honeycomb segments were bonded by suitably applying pressure from outside, followed by drying at 140° C. for 2 hours to obtain a honeycomb segment bonded body. The outer periphery of the honeycomb segment bonded body was cut into a cylindrical shape, and then the outer peripheral face was coated with a coating material, which was dried and cured at 700° C. for 2 hours to obtain a honeycomb structure.

(Evaluation of Bonding Material Layer)

The Young's modulus was calculated from a stress-strain diagram by measuring a displacement of a sample having a predetermined shape and cut out from a bonding material of a honeycomb structure when a predetermined compression load was applied (The Young's modulus of the members to be bonded was calculated from a load-displacement curve in three-point bending test according to JIS R1601). In addition, the average thermal expansion coefficient, porosity, thermal conductivity, and average pore size were measured, according to JIS R1618, the Archimedes method, JIS R1611, the mercury porosimetry, respectively, by cutting out a sample having a predetermined shape from a bonding material portion of the honeycomb structure. In addition, the ratio of the pores having a size of 0.5 to 50 μm with respect to the whole pores was calculated on the basis of the pore size distribution obtained by the mercury porosimetry. Incidentally, the average porosity $\epsilon 1$ of the bonding material layers (1) and (3) and the porosity of the bonding material layer (2) $\epsilon 2$ were measured by image analysis by observing a cross section perpendicular to a bonded surface of the bonding material with an electron microscope. The results are shown in Table 2.

(Evaluation of Honeycomb Structure)

With confirming the states of the honeycomb structure after bonding, a rapid heating test (burner spalling test) was performed at test temperatures of 900° C. and 1000° C. The state of crack generation of the honeycomb structure after the test was observed. The results are shown in Table 3.

[Burner Spalling Test (Rapid Heating Test)]

This is a test for evaluating a thermal shock resistance depending on temperature where a crack is not generated (The higher the temperature is, the higher the thermal shock resistance is.) of the honeycomb structure by making a temperature difference between the central portion and the outside portion by sending air heated with a burner into the honeycomb structure. Incidentally, in Table 3, x means a crack generated at a test temperature of 900° C., ○ means no crack at a test temperature of 900° C., and ⊚ means no crack at a test temperature of 1000° C.

Example 2 to 12, Comparative Example 1 to 4

In Examples 2 to 12, the honeycomb structures were manufactured in the same manner as in Example 1 except that the bonding material 1 in Example 1 was replaced by the bonding materials Nos. 2 to 12 shown in Table 1. In addition, in Comparative Examples 1 to 3, the honeycomb structures were manufactured in the same manner as in Example 1 except that the bonding material 1 in Example 1 was replaced by the bonding materials Nos. 13 to 15 shown in Table 1. In the Comparative Example 4, the honeycomb structure was manufactured in the same manner as in Comparative Example 1 except that the coating method of the bonding material 13 in Comparative Example 1 was changed. Each of the honeycomb structures obtained above (Examples 2 to 12, Comparative Examples 1 to 4) was evaluated and tested in the same manner as in Example 1. The results are shown in Tables 2 and 3.

TABLE 1

| Bonding material No. | Kind of filler | Degree of circularity of filer | Proportion of filler (vol %) | Proportion of filler of circularity of 0.7 or more to whole filler (vol %) | Proportion of matrix (vol %) | Other additives (mass %) |
|---|---|---|---|---|---|---|
| 1 | A: Silica glass<br>B: Silicon carbide | A: 0.95<br>B: 0.85 | A: 45<br>B: 10 | 100 | 45 | Dispersant: 0.15<br>Foaming resin: 0.5<br>Organic binder: 0.1 |
| 2 | A: Cordierite<br>B: Silicon carbide | A: 0.86<br>B: 0.85 | A: 45<br>B: 10 | 100 | 45 | Dispersant: 0.15<br>Foaming resin: 0.5<br>Organic binder: 0.1 |
| 3 | A: Silicon carbide<br>B: Silicon carbide | A: 0.98<br>B: 0.85 | A: 45<br>B: 10 | 100 | 45 | Dispersant: 0.15<br>Foaming resin: 0.5<br>Organic binder: 0.1 |
| 4 | A: Silicon carbide<br>B: Silicon carbide<br>C: Silica-alumina glass | A: 0.85<br>B: 0.89<br>C: 0.62 | A: 40<br>B: 10<br>C: 5 | 91 | 45 | Dispersant: 0.15<br>Foaming resin: 0.5<br>Organic binder: 0.1 |
| 5 | A: Silica glass<br>B: Silicon carbide | A: 0.85<br>B: 0.85 | A: 30<br>B: 30 | 100 | 40 | Dispersant: 0.15<br>Foaming resin: 0.5<br>Organic binder: 0.1 |
| 6 | A: Cordierite<br>B: Silicon carbide | A: 0.87<br>B: 0.85 | A: 30<br>B: 30 | 100 | 40 | Dispersant: 0.15<br>Foaming resin: 0.5<br>Organic binder: 0.1 |
| 7 | A: Silicon carbide<br>B: Silicon carbide | A: 0.88<br>B: 0.85 | A: 30<br>A: 30 | 100 | 40 | Dispersant: 0.15<br>Foaming resin: 0.5<br>Organic binder: 0.1 |

TABLE 1-continued

| Bonding material No. | Kind of filler | Degree of circularity of filer | Proportion of filler (vol %) | Proportion of filler of circularity of 0.7 or more to whole filler (vol %) | Proportion of matrix (vol %) | Other additives (mass %) |
|---|---|---|---|---|---|---|
| 8 | A: Silicon carbide<br>B: Silicon carbide<br>C: Silica-alumina glass | A: 0.85<br>B: 0.88<br>C: 0.62 | A: 25<br>B: 30<br>C: 5 | 91 | 40 | Dispersant: 0.15<br>Foaming resin: 0.5<br>Organic binder: 0.1 |
| 9 | A: Silicon carbide<br>B: Silicon carbide<br>C: Silica-alumina glass | A: 0.85<br>B: 0.88<br>C: 0.62 | A: 25<br>B: 30<br>C: 5 | 91 | 40 | Dispersant: 0.15<br>Foaming resin: 0.5<br>Organic binder: 0.5 |
| 10 | A: Silica glass<br>B: Silicon carbide | A: 0.95<br>B: 0.85 | A: 45<br>B: 10 | 100 | 45 | Dispersant: 0.15<br>Foaming resin: 0.1<br>Organic binder: 0.5 |
| 11 | A: Silica glass<br>B: Silicon carbide | A: 0.95<br>B: 0.85 | A: 45<br>B: 10 | 100 | 45 | Dispersant: 0.15<br>Foaming resin: 2<br>Organic binder: 0.5 |
| 12 | A: Silica glass<br>B: Silicon carbide | A: 0.95<br>B: 0.85 | A: 45<br>B: 10 | 100 | 45 | Dispersant: 0.15<br>Foaming resin: 2.5<br>Organic binder: 0.5 |
| 13 | A: Silica-alumina glass<br>B: Silicon carbide | A: 0.62<br>B: 0.88 | A: 40<br>B: 20 | 33 | 40 | Dispersant: 0.15<br>Foaming resin: 0.5<br>Organic binder: 0.1 |
| 14 | A: Silica glass<br>B: Silicon carbide | A: 0.95<br>B: 0.85 | A: 45<br>B: 10 | 100 | 45 | Dispersant: 0.15<br>Foaming resin: 3<br>Organic binder: 0.5 |
| 15 | A: Silica glass<br>B: Silicon carbide | A: 0.95<br>B: 0.85 | A: 45<br>B: 10 | 100 | 45 | Dispersant: 0.2<br>Foaming resin: 0.001<br>Organic binder: 0.01 |

TABLE 2

| | Bonding material No. | Ez/Ex | Porosity of bonding material layer (%) | Average pore size (μm) | Proportion of pores of 0.5 to 50 μm to whole pores (%) | $\epsilon_2/\epsilon_1$ | Ratio of Young's modulus of bonding material layer to member to be bonded (%) | Average linear thermal expansion coefficient of bonding material layer to member to be bonded (%) | Thermal conductivity of bonding material layer (W/mK) |
|---|---|---|---|---|---|---|---|---|---|
| Example 1 | 1 | 0.92 | 51 | 11 | 65 | 1.07 | 0.8 | 45 | 0.6 |
| Example 2 | 2 | 0.90 | 52 | 9 | 68 | 1.10 | 1.1 | 40 | 0.7 |
| Example 3 | 3 | 0.83 | 48 | 10 | 70 | 1.03 | 1.3 | 86 | 0.6 |
| Example 4 | 4 | 0.79 | 46 | 12 | 63 | 1.10 | 1.0 | 72 | 0.6 |
| Example 5 | 5 | 0.91 | 53 | 13 | 55 | 1.14 | 0.6 | 43 | 0.5 |
| Example 6 | 6 | 0.87 | 55 | 11 | 58 | 1.20 | 0.9 | 41 | 1.4 |
| Example 7 | 7 | 0.81 | 50 | 15 | 62 | 1.18 | 1.3 | 85 | 0.6 |
| Example 8 | 8 | 0.80 | 51 | 13 | 60 | 1.19 | 0.6 | 72 | 0.5 |
| Example 9 | 9 | 0.77 | 67 | 16 | 48 | 1.22 | 0.4 | 70 | 1.2 |
| Example 10 | 10 | 0.89 | 45 | 9 | 60 | 1.08 | 1.3 | 45 | 0.9 |
| Example 11 | 11 | 0.90 | 60 | 11 | 65 | 1.10 | 0.7 | 44 | 0.4 |
| Example 12 | 12 | 0.91 | 63 | 12 | 64 | 1.12 | 0.5 | 42 | 0.3 |
| Comp. Ex. 1 | 13 | 0.48 | 50 | 0.2 | 5 | 1.61 | 0.3 | 69 | 0.4 |
| Comp. Ex. 2 | 14 | 0.88 | 87 | 53 | 23 | 1.27 | 0.3 | 43 | 0.5 |
| Comp. Ex. 3 | 15 | 0.83 | 22 | 8 | 12 | 1.08 | 26 | 47 | 0.6 |
| Comp. Ex. 4 | 13 | 1.52 | 52 | 0.2 | 6 | 1.09 | 11 | 68 | 0.4 |

TABLE 3

| | Bonding material No. | Condition after bonding | Crack at end portion | Crack in outer peripheral portion |
|---|---|---|---|---|
| Example 1 | 1 | Good | ⊚ | ○ |
| Example 2 | 2 | Good | ⊚ | ○ |
| Example 3 | 3 | Good | ○ | ○ |
| Example 4 | 4 | Good | ○ | ○ |
| Example 5 | 5 | Good | ○ | ○ |
| Example 6 | 6 | Good | ○ | ○ |
| Example 7 | 7 | Good | ○ | ○ |
| Example 8 | 8 | Good | ○ | ○ |
| Example 9 | 9 | Good | ○ | ○ |
| Example 10 | 10 | Good | ○ | ○ |
| Example 11 | 11 | Good | ○ | ○ |
| Example 12 | 12 | Good | ○ | ○ |
| Comp. Ex. 1 | 13 | Good | X | ○ |
| Comp. Ex. 2 | 14 | Impossible bonding | — | — |
| Comp. Ex. 3 | 15 | Good | X | X |
| Comp. Ex. 4 | 13 | Good | ○ | X |

Discussion

Examples 1 to 12, Comparative Examples 1 to 4

From the results of Tables 2 and 3, in Examples 1 to 12, a filler having a circularity of 0.7 to 1 was contained at a ratio of 40 to 100 volume % with respect to the whole filler, and a bonding material composition having a dispersant, resin balloon, and organic binder which are optimized was used. Therefore, evaluations of the bonding material layer were good, bonding conditions between honeycomb segments were good, and the honeycomb structures were good with no crack generation in the end portions and the outer peripheral portions even after the quick heating test. In particular, in Examples 1 and 2, since the values of Ez/Ex were close to 1, the honeycomb structures were good with no crack generation in the end portions even by a quick heating test at high temperature.

On the other hand, in Comparative Example 1, since a bonding material composition contained a filler having a circularity of 0.7 to 1 at a ratio of 40 volume % with respect to the whole filler was used, Ez/Ex was below 5, and the ratio of pores of 0.5 to 50 μm to the whole pores was 5%, which was extremely low, and $\epsilon2/\epsilon1$ was above 1.4 (1.61) to cause a crack on the end portion of the honeycomb structure after the quick heating test. In addition, in Comparative Example 2, since the porosity after curing was above 85%, bonding between honeycomb segments was failed. Further, in Comparative Example 3, since the porosity after curing was less than 25%, bonding conditions between honeycomb segments were good. However, after the quick heating test, a crack was caused in an end portion and the peripheral portion of the honeycomb structure. In Comparative Example 4, since a bonding material composition containing a filler having a circularity of 0.7 to 1 at a ratio of below 40 volume % (33 volume %) with respect to the whole filler was used, Ez/Ex was above 1.5, and the ratio of pores of 0.5 to 50 μm to the whole pores was 6%, which was extremely low, and a crack was caused in the outer peripheral portion of the honeycomb structure.

INDUSTRIAL APPLICABILITY

A bonding material composition and a bonded body can suitably be used upon manufacturing a trapping filter for exhaust gas, in particular, a diesel particulate filter (DPF) for trapping particulate matter in exhaust gas from a diesel engine.

The invention claimed is:

1. A bonded body comprising:
   two or more members unitarily bonded by means of a bonding material layer, wherein
   a relational expression of 0.5<Ez/Ex<1.5 is satisfied when a Young's modulus in a direction perpendicular to a bonded surface of the bonding material layer is Ez and a Young's modulus in a direction parallel to the bonded surface and parallel to a longer axial direction of the bonded surface is Ex, and
   the bonding material layer has a porosity of 25 to 85%.

2. The bonded body according to claim 1, wherein a bonding material composition forming the bonding material layer contains a filler having a degree of circularity of 0.7 to 1 at a ratio of 40 to 100 volume % with respect to the whole filler.

3. The bonded body according to claim 1, wherein the bonding material layer has an average pore size of 0.5 to 50 μm.

4. The bonded body according to claim 1, wherein the bonding material layer has pores having a size of 0.5 to 50 μm at a ratio of 50% or more with respect to the whole pores.

5. The bonded body according to claim 1, wherein, in the case of bonding a first member to be bonded to a second member to be bonded by means of the bonding material layer having a thickness of t:
   a portion of the bonding material layer having a thickness of 0.25t from an interface between the first member and the bonding material layer is defined as a first bonding material layer,
   a portion of the bonding material layer having thickness of 0.25t from an interface between the second member and the bonding material layer is defined as a second bonding material layer,
   a portion of the bonding material layer having a thickness of 0.5t between the first bonding material layer and the second bonding material layer is defined as a third bonding material layer, and
   an average porosity $\epsilon1$ of the first and second bonding material layers and a porosity $\epsilon2$ of the third bonding material layer satisfy a relational expression of $0.9<\epsilon2/\epsilon1<1.4$.

6. The bonded body according to claim 1, wherein a Young's modulus of the bonding material layer is 0.1 to 20% of that of the members to be bonded.

7. The bonded body according to claim 1, wherein an average linear thermal expansion coefficient of the bonding material layer is 0.1 to 70% of that of the members to be bonded.

8. The bonded body according to claim 1, wherein the bonding material layer has a thermal conductivity of 0.1 to 20 W/mK.

9. The bonded body according to claim 2, wherein the filler is at least one kind selected from the group consisting of silica, alumina, mullite, zirconia, cordierite, silicon carbide, silica glass, and alumina-silica glass.

10. A bonding material composition for forming the bonding material layer used for the bonded body according to claim 1, wherein the bonding material composition contains a filler and an inorganic bonding agent as main components.

11. A bonding material composition for forming the bonding material layer used for the bonded body according to claim 9, wherein the bonding material composition contains the filler and an inorganic bonding agent as main components.

12. The bonding material composition according to claim 10, wherein the filler is at least one kind selected from the group consisting of silica, alumina, mullite, zirconia, cordierite, silicon carbide, silica glass, and alumina-silica glass.

13. The bonding material composition according to claim 10, wherein the bonding material composition contains 0.1 to 2.5 mass % of a resin balloon.

14. The bonded body having the bonding material layer formed of the bonding material composition according to claim 10.

15. A honeycomb segment bonded body manufactured by bonding a plurality of honeycomb segments together by the bonding material composition according to claim 10.

16. A honeycomb structure manufactured by a the honeycomb segment bonded body according to claim 15.

* * * * *